United States Patent [19]
Kass et al.

[11] Patent Number: 5,531,068
[45] Date of Patent: Jul. 2, 1996

[54] COMBINATION CATALYST/ADSORBER SYSTEM FOR TREATING AN ENGINE EXHAUST GAS STREAM

[75] Inventors: Lawrence T. Kass, White Plains, N.Y.; Timothy M. Cowan, Lincoln Park; Dennis Reinertsen, Mt. Olive, both of N.J.; Stephen R. Dunne, Bethel, Conn.

[73] Assignee: UOP, Des Plaines, Ill.

[21] Appl. No.: 492,379

[22] Filed: Jun. 19, 1995

[51] Int. Cl.$^6$ .................................................. F01N 3/20
[52] U.S. Cl. ............................ 60/274; 60/296; 60/297
[58] Field of Search ............................ 60/274, 296, 297

[56] References Cited

U.S. PATENT DOCUMENTS

| | | | |
|---|---|---|---|
| 2,942,932 | 4/1957 | Elliott. | |
| 3,072,457 | 1/1963 | Bloch | 60/296 |
| 3,699,683 | 10/1972 | Tourtellotte et al. | 60/274 |
| 3,889,464 | 6/1975 | Gardner | 60/296 |
| 4,916,897 | 4/1990 | Hayashi | 60/296 |
| 4,985,210 | 1/1991 | Minami | 422/169 |
| 5,051,244 | 9/1991 | Dunne et al. | 423/212 |
| 5,125,231 | 1/1992 | Patil et al. | 60/274 |
| 5,140,811 | 8/1992 | Minami et al. | 60/297 |
| 5,306,185 | 4/1994 | Lassanske | 60/296 |

FOREIGN PATENT DOCUMENTS

| | | | |
|---|---|---|---|
| 1205980 | 6/1986 | Canada. | |
| 2214772 | 9/1973 | Germany. | |
| 135613 | 7/1985 | Japan | 60/296 |

*Primary Examiner*—Douglas Hart
*Attorney, Agent, or Firm*—Thomas K. McBride; Eugene I. Snyder; Frank S. Molinaro

[57] ABSTRACT

A process for treating an engine exhaust gas stream is disclosed. The process involves arranging a catalyst bed and a molecular sieve bed side by side with a connecting pipe between and parallel to the two beds. When the engine is first started, the cool exhaust is flowed through the catalyst bed, then through the connecting pipe, then through the molecular sieve bed and finally discharged to the atmosphere. When the molecular sieve bed reaches a temperature of about 150° C. to about 200° C. the exhaust stream is diverted such that it is first flowed through the molecular sieve bed, to desorb the adsorbed hydrocarbons, and then through the catalyst bed and finally discharged to the atmosphere. Finally, when all the hydrocarbons are desorbed from the molecular sieve bed, the exhaust stream is diverted such that it is flowed through the catalyst bed and then discharged to the atmosphere.

10 Claims, 1 Drawing Sheet

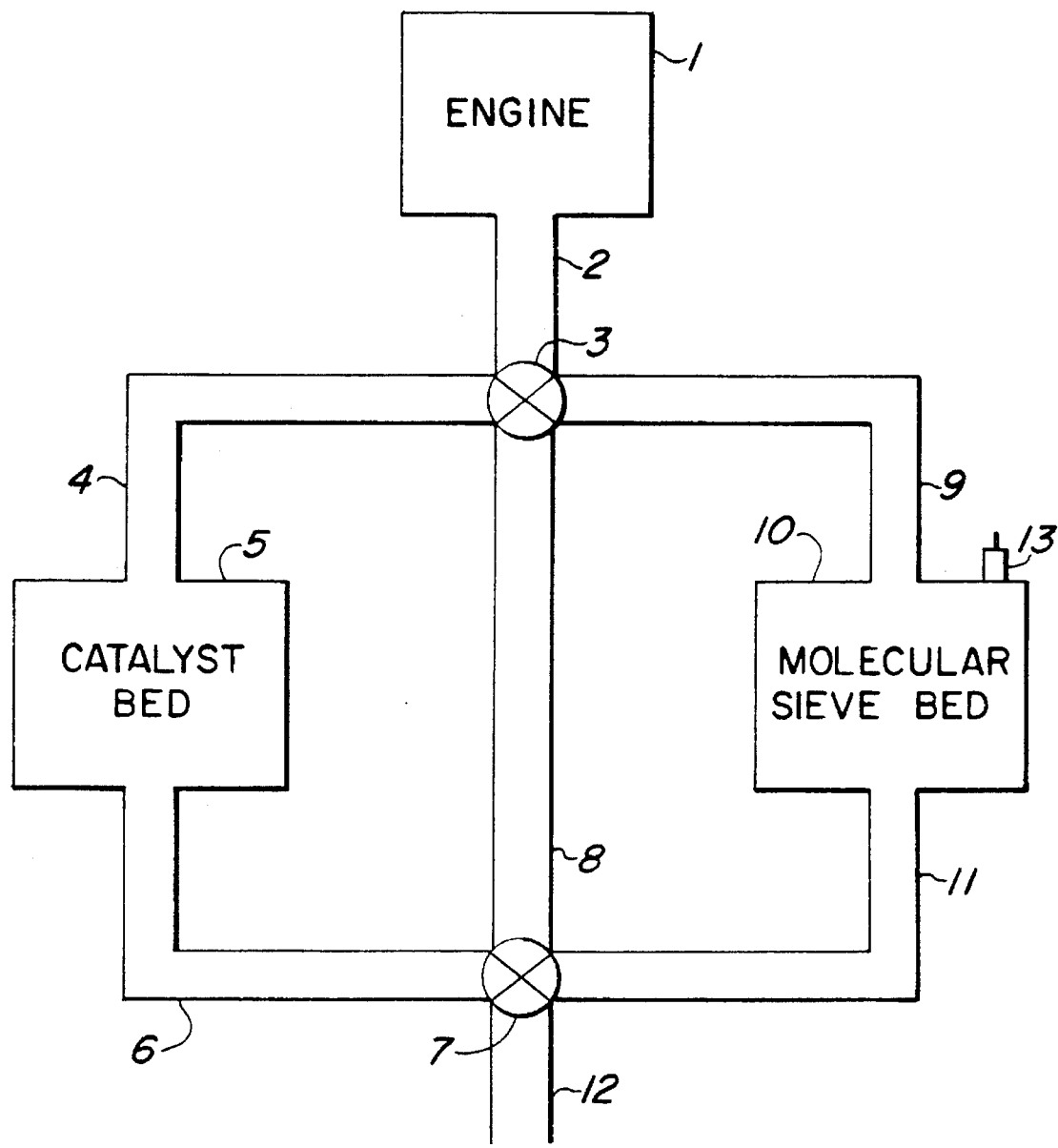

COMBINATION CATALYST/ADSORBER SYSTEM FOR TREATING AN ENGINE EXHAUST GAS STREAM

FIELD OF THE INVENTION

This invention relates to a process for treating an engine exhaust gas stream. More specifically, this invention provides a novel combination of a catalyst bed and an adsorber bed to minimize hydrocarbon emissions during the cold start operation of an engine.

BACKGROUND OF THE INVENTION

Gaseous waste products resulting from the combustion of hydrocarbonaceous fuels, such as gasoline and fuel oils, comprise carbon monoxide, hydrocarbons and nitrogen oxides as products of combustion or incomplete combustion, and pose a serious health problem with respect to pollution of the atmosphere. While exhaust gases from other carbonaceous fuel-burning sources, such as stationary engines, industrial furnaces, etc., contribute substantially to air pollution, the exhaust gases from automotive engines are a principal source of pollution. Because of these health problem concerns, the Environmental Protection Agency (EPA) has promulgated strict controls on the amounts of carbon monoxide, hydrocarbons and nitrogen oxides which automobiles can emit. The implementation of these controls has resulted in the use of catalytic converters to reduce the amount of pollutants emitted from automobiles.

In order to achieve the simultaneous conversion of carbon monoxide, hydrocarbon and nitrogen oxide pollutants, it has become the practice to employ catalysts in conjunction with air-to-fuel ratio control means which function in response to a feedback signal from an oxygen sensor in the engine exhaust system. Although these three component control catalysts work quite well after they have reached operating temperature of about 300° C., at lower temperatures they are not able to convert substantial amounts of the pollutants. What this means is that when an engine and in particular an automobile engine is started up, the three component control catalyst is not able to convert the hydrocarbons and other pollutants to innocuous compounds. Despite this limitation, current state of the art catalysts are able to meet the current emission standards. However, California has recently set new hydrocarbon standards (similar standards have been promulgated nationwide) which can not be met with the current state of the art three component control catalysts.

The art contains several references which describe systems that have been devised to attempt to solve this cold start emission problem. One such reference is U.S. Pat. No. 3,699,683 in which an adsorbent bed is placed after both a reducing catalyst and an oxidizing catalyst. The patentees disclose that when the exhaust gas stream is below 200° C. the gas stream is flowed through the reducing catalyst then through the oxidizing catalyst and finally through the adsorbent bed, thereby adsorbing hydrocarbons on the adsorbent bed. When the temperature goes above 200° C. the gas stream which is discharged from the oxidation catalyst is divided into a major and minor portion, the major portion being discharged directly into the atmosphere and the minor portion passing through the adsorbent bed whereby unburned hydrocarbon is desorbed and then flowing the resulting minor portion of this exhaust stream containing the desorbed unburned hydrocarbons into the engine where they are burned.

Another reference is U.S. Pat. No. 2,942,932 which teaches a process for oxidizing carbon monoxide and hydrocarbons which are contained in exhaust gas streams. The process disclosed in this patent consists of flowing an exhaust stream which is below 800° F. into an adsorption zone which adsorbs the carbon monoxide and hydrocarbons and then passing the resultant stream from this adsorption zone into an oxidation zone. When the temperature of the exhaust gas stream reaches about 800° F. the exhaust stream is no longer passed through the adsorption zone but is passed directly to the oxidation zone with the addition of excess air.

Canadian Patent No. 1,205,980 discloses a method of reducing exhaust emissions from an alcohol fueled automotive vehicle. This method consists of directing the cool engine startup exhaust gas through a bed of zeolite particles and then over an oxidation catalyst and then the gas is discharged to the atmosphere. As the exhaust gas stream warms up it is continuously passed over the adsorption bed and then over the oxidation bed.

U.S. Pat. No. 5,051,244 discloses a process where an adsorbent is placed in front of a catalyst. Initially the exhaust is flowed through the adsorbent bed and then through the catalyst. After the adsorbent bed is at a temperature of 150° C., the exhaust flow is diverted around the adsorbent bed and through the catalyst. Once the catalyst has reached operating conditions, the hydrocarbons which were adsorbed on the adsorbent bed are desorbed by flowing exhaust gas through the adsorbent and then bypassing the adsorbent bed.

German Patent Application No. 2,214,772 discloses a process in which the exhaust is flowed first through a reducing catalyst, then through a charcoal filter and then through an oxidation catalyst. After the system has reached its operating temperature, the charcoal filter is bypassed in order to prevent oxidation of the charcoal.

U.S. Pat. No. 4,985,210 discloses a process for treating an automotive exhaust by using an adsorbent bed followed by a catalyst. The adsorbent bed contains a mordenite or a Y-type zeolite.

U.S. Pat. No. 5,125,231 discloses a system comprising a catalyst followed by a catalyzed adsorber. Engine exhaust is selectively conveyed to the catalyst or catalyzed adsorber such that hydrocarbons are first held by the adsorber and then released and recycled through the catalyst when the catalyst has reached its operating temperature.

Finally, U.S. Pat. No. 5,140,811 discloses a process in which an adsorber is placed in front of a catalyst. When the gas temperature reaches 200° C., the adsorber is bypassed and when the gas temperature reaches 400° C., the gas flow is again passed through the adsorber and then through the catalyst.

In contrast to this art, applicants have developed a unique system in which the catalyst and molecular sieve bed (adsorber) are arranged side by side with a connecting pipe between and parallel to them. When the engine is first started, the relatively cool engine exhaust stream is diverted through the catalyst bed, then through the connecting pipe, then through the molecular sieve bed and finally discharged to the atmosphere. The molecular sieve bed will preferentially adsorb hydrocarbons versus water under the conditions present in the exhaust stream.

As the engine exhaust stream warms up, both the catalyst bed and the molecular sieve bed will also warm up. At a temperature of about 150° C. to about 200° C. the hydrocarbons on the molecular sieve bed will begin to desorb. Before the hydrocarbons begin to desorb from the molecular sieve, the engine exhaust stream is diverted such that it is first flowed through the molecular sieve bed, then through the connecting pipe, then through the catalyst bed and finally discharged to the atmosphere. Finally, when all the hydrocarbons have been desorbed from the molecular sieve bed, the engine exhaust stream is again diverted so that it flows through the catalyst bed and then discharged to the atmosphere.

None of the art cited hints at a process where the engine exhaust stream is first flowed through a catalyst and then an adsorber but at a later time the exhaust stream is first flowed through an adsorber and then through a catalyst. Applicants' invention affords a very compact and efficient pollutant control system and process which is completely different from the various processes and systems found in the art.

SUMMARY OF THE INVENTION

This invention generally relates to a process for treating an engine exhaust stream. Accordingly, one embodiment of the invention is a process for treating an engine exhaust gas stream containing pollutants including hydrocarbons comprising:

a) adjusting a first diverter valve upstream of a catalyst bed containing at least one catalyst such that a cold start engine exhaust stream is directed through the catalyst bed to provide a first treated exhaust stream which is flowed through a second diverter valve which directs said first treated exhaust stream through a connecting pipe, through the first diverter valve and then through a molecular sieve bed containing at least one molecular sieve which preferentially adsorbs hydrocarbons in said first treated exhaust stream versus water to provide a final treated exhaust stream which is flowed through the second diverter valve and then discharged to the atmosphere;

b) continuing to flow an increasingly warmer engine exhaust stream per step (a) until the molecular sieve bed reaches a temperatures of about 150° C. to about 200° C., at which time the first diverter valve is adjusted such that the engine exhaust stream is flowed through the molecular sieve bed, thereby desorbing the adsorbed hydrocarbons and providing a second treated exhaust stream containing the desorbed hydrocarbons which is flowed through the second diverter valve which is adjusted to direct said second stream through the connecting pipe, through the first diverter valve and then through the catalyst bed to convert the pollutants to innocuous compounds to provide a final treated exhaust stream which is flowed through the second diverter valve and then discharged to the atmosphere;

c) continuing to flow the engine exhaust stream as in step (b) for a time sufficient to desorb substantially all the hydrocarbons on the molecular sieve, at which time the first diverter valve is adjusted such that the engine exhaust stream is flowed through the catalyst bed, thereby producing a final treated exhaust and flowing said final treated exhaust through the second diverter valve which is adjusted such that the final treated exhaust stream is discharged to the atmosphere.

This and other objects and embodiments will become more apparent after a more detailed description of the invention.

BRIEF DESCRIPTION OF THE DRAWING

The Drawing is a schematic view of one embodiment of this invention and shows the configuration of the components of this invention.

DETAILED DESCRIPTION OF THE INVENTION

The process of the present invention employs a catalyst bed and a molecular sieve bed in a side-by-side configuration for treating an engine exhaust gas stream. The catalyst bed which is an essential element of the present invention contains catalysts of the type typically used to treat exhaust streams from internal combustion engines. Automotive exhaust streams contain numerous pollutants including uncombusted or partially combusted hydrocarbons, carbon monoxide and nitric oxides. Catalysts which are capable of oxidizing hydrocarbons and carbon monoxide to carbon dioxide and water, i.e., innocuous compounds are referred to as oxidation catalysts, while catalysts which can simultaneously oxidize hydrocarbons and carbon monoxide while reducing nitric oxides to nitrogen and oxygen are referred to as three component control catalysts. Examples of these catalysts are those described in U.S. Pat. Nos. 4,528,279; 4,791,091; 4,760,044; 4,868,148; and 4,868,149, which are all incorporated by reference. Preferred catalysts well known in the art are those that contain platinum and rhodium and optionally palladium, while oxidation catalysts usually do not contain rhodium. Oxidation catalysts usually contain platinum and/or palladium metal. These catalysts may also contain promoters and stabilizers such as barium, cerium, lanthanum, nickel, and iron. The noble metals promoters and stabilizers are usually deposited on a support such as alumina, silica, titania, zirconia, aluminosilicates, and mixtures thereof with alumina being preferred. The catalyst can be conveniently employed in particulate form or the catalytic composite can be deposited on a solid monolithic carrier with a monolithic carrier being preferred.

When particulate form is desired, the support can be formed into shapes such as pills, pellets, granules, tings, spheres, etc., on which are deposited the desired noble metals and promoters. If a monolithic form is desired, the catalyst support is applied to the monolithic form as a thin film or coating deposited on the monolith. The inert monolithic carrier can be comprised of any inert material which provides the structural support for the catalyst. Usually this material can be any refractory material such as ceramic or metallic materials. It is desirable that the carrier material be unreactive with the catalyst support and catalytic components and not be degraded by the gas to which it is exposed. Examples of suitable ceramic materials include sillimanite, petalite, cordierite, mullite, zircon, zircon mullite, spodumene, alumina-titanate, etc. Metallic materials which are within the scope of this invention include metals and alloys as disclosed in U.S. Pat. No. 3,920,583 which are oxidation resistant and are otherwise capable of withstanding high temperatures.

The carrier material can best be utilized in any rigid unitary configuration which provides a plurality of pores or channels extending in the direction of gas flow. It is preferred that the configuration be a honeycomb configuration. The honeycomb structure can be used advantageously in either unitary form, or as an arrangement of multiple modules. The honeycomb structure is usually oriented such that gas flow is generally in the same direction as the cells or channels of the honeycomb structure. For a more detailed discussion of monolithic structures, refer to U.S. Pat. Nos. 3,785,998 and 3,767,453.

The catalyst support is deposited onto the carrier material by any convenient way well known in the art. A preferred method involves preparing a slurry using the support, e.g., alumina, and coating the monolithic honeycomb carrier with the slurry. The slurry can be prepared by means known in the art such as combining the appropriate amount of the support with water and acid. This mixture is then blended by using means such as sonification, milling, etc. This slurry is used to coat a monolithic honeycomb by dipping the honeycomb into the slurry, removing the excess slurry by draining or blowing out the channels, and heating to about 100° C. If the desired loading of support is not achieved, the above process may be repeated as many times as required to achieve the desired loading.

The support will contain one or more catalytic metals, as enumerated above, dispersed thereon. The desired catalytic metal may be deposited onto the support in any suitable manner well known in the art. One such procedure involves impregnating the support, either in particulate form or deposited on a monolithic support, with an aqueous solution of a decomposable compound of the desired noble metal or metals, drying the support which has the noble metal compound dispersed on it and then calcining in air at a temperature of about 400° C. to about 500° C. for a time of about 1 to about 4 hours. By decomposable compound is meant a compound which upon heating in air gives the metal or metal oxide. Examples of the decomposable compounds which can be used are set forth in U.S. Pat. No. 4,791,091 which is incorporated by reference. Preferred decomposable compounds are chloroplatinic acid, rhodium trichloride, chloropalladic acid, hexachloroiridate (IV) acid and hexachlororuthenate. It is preferable that the noble metal be present in an amount ranging from about 0.01 to about 4 weight percent of the molecular sieve support. Specifically, in the case of platinum and palladium the range is 0.1 to 4 weight percent, while in the case of rhodium the range is from about 0.01 to 2 weight percent.

The molecular sieves which make up the molecular sieve bed are those molecular sieves which meet the following criteria: 1) have a framework Si:Al ratio of at least 2.4; 2) are hydrothermally stable and 3) have a hydrocarbon selectivity ($^\alpha HC-H_2O$) greater than 1.0. By hydrothermally stable is meant the ability of the molecular sieve to maintain its structure after thermal cycling in the exhaust gas stream. One method of measuring hydrothermal stability is to look at the temperature at which 50% of the structure is decomposed after heating for 16 hours in air. The temperature is referred to as T(50). Accordingly, as used in this application, by hydrothermally stable is meant a molecular sieve which has a T(50) of at least 750° C. The hydrocarbon selectivity $\alpha$ is defined by the following equation:

$$\alpha HC-H_2O = \frac{x_{HC}}{x_{H_2O}} \cdot \frac{[H_2O]}{[HC]}$$

$x_{HC}$=the hydrocarbon co-loading on the molecular sieve in equilibrium with the hydrocarbon and water vapor mixture in the gas phase over the zeolite adsorbent;
$x_{H_2O}$=the water co-loading on the molecular sieve in equilibrium with the water and hydrocarbon vapor mixture in the gas phase over the molecular sieve adsorbent;
$[H_2O]$=the concentration of water vapor in the exhaust gas stream; and
$[HC]$=the concentration of the hydrocarbon species in the exhaust gas.

The above definitions show that the selectivity of molecular sieves for hydrocarbons over water is dependent upon the exhaust gas stream temperature, the particular hydrocarbon species of interest and the relative concentrations of water vapor and hydrocarbon.

In order to calculate $x_{HC}$ and $x_{H_2O}$ one needs to first determine the intrinsic adsorption strength of the molecular sieve. Intrinsic adsorption strength can be described by reference to the Dubinin-Polanyi model for adsorption. The model says that the sorption expressed as the volume of the sorbent structure occupied by the sorbate is a unique function of the Gibbs Free Energy change on adsorption. Mathematically this relationship takes the form of a Gaussian distribution with Gibbs free energy change as follows:

$$X = Liq.\ dens\ ^* VO\ ^* \exp(-B^* G^* G)$$

where X is the loading expected, VO is the pore volume (cc/g), B is a constant that is dependent on the sorbent and sorbate, and G is the Gibbs Free Energy change. The product of liquid density and VO equates to the saturation loading, XO, for any pure compound by the Gurvitsch Rule. (see Breck, Zeolite Molecular Sieves, page 426.)

For ideal gases $G=RT \ln (P^o/P)$.

The constant B is then inversely related to the intrinsic adsorption strength. For example, if the hydrocarbon is benzene, a value of B of 0.04 for both benzene and water gives good results. The estimates of water and hydrocarbon co-loadings are made in the following way:

1) each individual component loading is estimated by use of the Dubinin-Polanyi model as outlined above. For each compound present one needs to know the liquid phase density (approximating the sorbed phase density), the vapor pressure as a function of temperature, and the actual concentration of the species in the gas.

2) Once each pure component loading is calculated the function $\Phi$ is calculated as, $$\Phi = X/XO/(1-(X/XO))$$

where X/XO is the loading ratio or fraction of the pore volume filled by each component if it were present alone. $\Phi$ then represents the ratio of occupied pore volume to unoccupied pore volume.

3) The co-loadings are then calculated, accounting for each species present, by the formula, $$X_{mc} = XO^*\Phi/(1+\Sigma\Phi)$$

$X_{mc}$ is the co-loading of each component on the zeolite. This procedure follows the Loading Ratio Correlation, which is described in "Multicomponent Adsorption Equilibria on Molecular Sieves", C. M. Yon and P. H. Turnock AICHE Symposium Series, No. 117, Vol. 67 (1971).

Both natural and synthetic molecular sieves may be used as adsorbents. Examples of natural molecular sieves which can be used are faujasites, clinoptilolites, mordenites, and chabazite. Examples of synthetic molecular sieves which can be used are silicalite, zeolite Y, ultrastable zeolite Y and ZSM-5. Of course mixtures of these molecular sieves, both natural and synthetic, can be used.

The molecular sieve bed used in the present invention can contain the molecular sieve in particulate form or the molecular sieve can be deposited onto a solid monolithic carrier. When particulate form is desired, the molecular sieve can be formed into shapes such as pills, pellets, granules, rings, spheres, etc. In the employment of a monolithic form, it is usually most convenient to employ the molecular sieve as a thin film or coating deposited on an inert monolithic carrier which provides the structural support for the molecular sieve. The monolithic carrier and the process of depositing the molecular sieve on said carrier are the same as set forth for the catalyst above. It is preferred that the molecular sieve be deposited on a monolithic honeycomb carrier in order to minimize the size of the molecular sieve bed and the back pressure exerted on the engine. Instead of depositing the molecular sieve onto a monolithic honeycomb structure, one can take the molecular sieve and form it into a monolithic honeycomb structure by means known in the art. The size of the molecular sieve bed is chosen such that at least 40% of the hydrocarbons in the cold-start exhaust stream discharged from the engine is adsorbed.

Finally, the molecular sieve may optionally contain one or more catalytic metals dispersed thereon. These catalytic metals are the same as enumerated for the catalyst bed above and the processes for depositing these metals onto the molecular sieves are the same as those described above.

Referring now to the drawing, the engine 1 consists of any internal combustion engine which generates an exhaust: gas stream containing pollutants including uncombusted or partially degraded hydrocarbons, carbon monoxide and nitrogen oxides. The engine may be fueled by gasoline, diesel fuel, ethanol, methanol or mixtures thereof. Engine 1 is initially operating at a relatively reduced temperature which produces a relatively high concentration of hydrocarbon vapors in the engine exhaust gas stream.

The engine exhaust gas stream under stamp conditions is generally at a temperature below 500° C. and typically in the range of 200° C. to 400° C., and contains pollutants including high concentration of hydrocarbons as well as nitrogen oxides and carbon monoxide. Pollutants will be used herein to collectively refer to any unburned fuel components and combustion byproducts found in the exhaust stream. For example, when the fuel is gasoline, hydrocarbons, nitrogen oxides, carbon monoxide and other combustion byproducts will be found in the exhaust gas stream. The engine exhaust stream is produced at this relatively low temperature during the initial period of engine operation, typically for the first 30 seconds to 120 seconds after startup of a cold engine. The engine exhaust stream will typically contain, by volume, 500 to 1000 ppm hydrocarbons.

The engine exhaust stream is discharged from the engine through the exhaust manifold (not shown) and then through exhaust pipe 2 and through diverter valve 3 which directs the exhaust stream through exhaust pipe 4 and then through catalyst bed 5. As stated, the catalyst bed will contain a catalyst either in particulate form or monolithic form which contains catalytic metals such as platinum and palladium. Because of the relatively low temperature of the engine exhaust stream, the catalyst bed does not function at a very high efficiency, i.e., only partially converts the pollutants, and therefore, the first treated exhaust stream which is discharged from the catalyst bed still contains large quantities of hydrocarbons.

The first treated exhaust stream which is discharged from the catalyst bed is now flowed through exhaust pipe 6 and then through a second diverter valve 7 which directs the first treated exhaust stream through connecting pipe 8, through diverter valve 3 and then through pipe 9 and molecular sieve bed 10. Connecting pipe 8 rum parallel to the catalyst bed and molecular sieve bed and facilitates flowing the exhaust stream from the outlet of the catalyst bed to the inlet of the molecular sieve bed and vice versa. The connecting pipe 8 may optionally be equipped with a heat sink such as a metal honeycomb or other high heat capacity matrix structure which cools the first treated exhaust stream prior to flowing it through the molecular sieve bed. The molecular sieve bed contains at least one molecular sieve which has a high selectivity for hydrocarbons versus water, thereby adsorbing the hydrocarbons on the molecular sieve. The molecular sieve is present either in particulate form or monolithic form as described above. The final treated exhaust stream from the molecular sieve bed 10 is now flowed through exhaust pipe 11, then through diverted valve 7 and directed through exhaust pipe 12 to the atmosphere.

As the engine warms up, the engine exhaust stream also warms up which in turn heats up the catalyst bed and molecular sieve bed. As stated, the molecular sieve is only capable of adsorbing hydrocarbons up to a temperature of about 150° C. to about 200° C., at which point the hydrocarbons begin to desorb from the molecular sieve. The temperature of the adsorbent bed is measured by temperature sensing element 13 which typically consists of a thermocouple or other temperature sensing device which transmits an electric signal to a microprocessor located on the engine. When the molecular sieve bed reaches a preset temperature of about 150° C. to about 200° C., the microprocessor sends a message to diverting valve 3, adjusting diverter valve 3 such that the engine exhaust stream is directed through exhaust pipe 9 and then through molecular sieve bed 10. The presence of an optional heat sink in connecting pipe 8 cools the first treated exhaust enough so that it takes a much longer amount of time for the molecular sieve bed to reach its desorption temperature.

The hot engine exhaust stream which flows through the molecular sieve bed desorbs the hydrocarbons adsorbed on the molecular sieve and provides a second treated exhaust stream containing desorbed hydrocarbons. This second treated exhaust stream is now flowed through pipe 11 and then through diverter valve 7 which has been adjusted by the microprocessor simultaneously to adjusting diverted valve 3 such that the second treated exhaust stream is now flowed through connecting pipe 8, through diverter valve 3, through pipe 4 and then through catalyst bed 5. Since the catalyst bed 5 is now at its operating temperature, it is capable of fully treating the second exhaust stream to provide a final treated exhaust. Finally, the final treated exhaust which is discharged from the catalyst bed is flowed through pipe 6, then through diverter valve 7 and finally discharged to the atmosphere through pipe 12. The optional heat sink which can be present in connecting pipe 8 has now reached the temperature of the hot engine exhaust stream. Accordingly, when the second exhaust stream is flowed through connecting pipe 8, the second exhaust stream is warmed by the heat stored in the heat sink, thereby preventing the second exhaust stream from lowering the temperature of catalyst bed 5.

The hot engine exhaust stream is flowed in this manner until all the hydrocarbons are desorbed from the molecular sieve which usually takes from about 1 to about 2 minutes. At the end of this time period, the microprocessor sends a message to diverter valves 3 and 7 adjusting them such that the engine exhaust stream is flowed through pipe 4, then through catalyst bed 5 to provide a final treated exhaust stream. The final treated exhaust stream is now flowed through pipe 6, then through diverter valve 7 and finally discharged to the atmosphere via pipe 12.

We claim as our invention:

1. A process for treating an engine exhaust gas stream containing pollutants including hydrocarbons comprising:

a) adjusting a first diverter valve upstream of a catalyst bed containing at least one catalyst such that a cold start engine exhaust stream is directed through the catalyst bed to provide a first treated exhaust stream which is flowed through a second diverter valve which directs said first treated exhaust stream through a connecting pipe, through the first diverter valve and then through a molecular sieve bed containing at least one molecular sieve which preferentially adsorbs hydrocarbons in said first treated exhaust stream versus water to provide a final treated exhaust stream which is flowed through the second diverter valve and then discharged to the atmosphere;

b) continuing to flow an increasingly warmer engine exhaust stream per step (a) until the molecular sieve bed reaches a temperature of about 150° C. to about 200° C., at which time the first diverter valve is adjusted such that the engine exhaust stream is flowed through the molecular sieve bed, thereby desorbing the adsorbed hydrocarbons and providing a second treated exhaust stream containing the desorbed hydrocarbons which is flowed through the second diverter valve which is adjusted to direct said second stream through the connecting pipe, through the first diverter valve and then through the catalyst bed to convert the pollutants to innocuous compounds to provide a final treated exhaust stream which is flowed through the second diverter valve and then discharged to the atmosphere;

c) continuing to flow the engine exhaust stream as in step (b) for a time sufficient to desorb substantially all the hydrocarbons on the molecular sieve, at which time the first diverter valve is adjusted such that the engine exhaust stream is flowed through the catalyst bed, thereby producing a final treated exhaust and flowing said final treated exhaust through the second diverter valve which is adjusted such that the final treated exhaust stream is discharged to the atmosphere.

2. The process of claim 1 where the connecting pipe contains a heat sink.

3. The process of claim 1 where the time necessary for desorbing substantially all the hydrocarbons from the molecular sieve varies from about 1 to about 2 minutes.

4. The process of claim 1 where the molecular sieve is selected from the group consisting of molecular sieves which: 1) have a framework Si:Al ratio of at least 2.4; 2) are hydrothermally stable; and 3) have a hydrocarbon selectivity ($\alpha$HC-H$_2$O) greater than 1 where $\alpha$HC-H$_2$O is defined by the following equation:

$$\alpha\text{HC--H}_2\text{O} = \frac{x_{HC}}{x_{H_2O}} \cdot \frac{[H_2O]}{[HC]}$$

where $x_{HC}$ is the hydrocarbon co-loading on the molecular sieves in equilibrium with the hydrocarbon water vapor mixture in the gas phase over the molecular sieve adsorbent; $x_{H_2O}$ is the water co-loading on the molecular sieve in equilibrium with the water and hydrocarbon vapor mixture in the gas phase over the molecular sieve adsorbent; [H$_2$O] is the concentration of water and [HC] is the concentration of hydrocarbon in the exhaust stream.

5. The process of claim 4 where the molecular sieve is selected from the group consisting of silicalite, faujasite, clinoptilolites, mordenites, chabazite, zeolite ultrastable Y, zeolite Y, ZSM-5 and mixtures thereof.

6. The process of claim 5 where the molecular sieve is faujasite.

7. The process of claim 5 where the molecular sieve is zeolite ultrastable Y.

8. The process of claim 1 where the molecular sieve bed is a honeycomb monolithic carrier having deposited thereon at least one molecular sieve.

9. The process of claim 1 where the catalyst comprises an alumina support having dispersed thereon at least one noble metal selected from the group consisting of platinum, palladium, rhodium and mixtures thereof and at least one promoter selected from the group consisting of cerium, lanthanum, nickel, iron and mixtures thereof.

10. The process of claim 9 where the primary catalyst comprises a monolithic carrier having deposited thereon an alumina support, said support having dispersed thereon platinum, rhodium and cerium.

\* \* \* \* \*